United States Patent [19]

Feldman

[11] 4,097,803
[45] Jun. 27, 1978

[54] BATTERY SELF-DISCHARGE INDICATOR
[75] Inventor: Keiva Feldman, Ottawa, Canada
[73] Assignee: Her Majesty the Queen as represented by the Minister of National Defence of Her Majesty's Canadian Government, Ottawa, Canada
[21] Appl. No.: 735,820
[22] Filed: Oct. 26, 1976
[30] Foreign Application Priority Data
Apr. 30, 1976  Canada .................................. 251571
[51] Int. Cl.² ........................................... G01N 27/42
[52] U.S. Cl. .................... 324/29.5; 204/270; 320/48
[58] Field of Search ....................... 204/229, 230, 270; 320/2, 48; 324/29, 30 R, 29.5

[56] References Cited
U.S. PATENT DOCUMENTS
3,500,167  3/1970  Applegate et al. ..................... 320/48
3,764,508  10/1973  Johnson, Jr. ........................... 204/270

Primary Examiner—Rudolph V. Rolinec
Assistant Examiner—Michael J. Tokar
Attorney, Agent, or Firm—Michael M. Sakovich

[57] ABSTRACT

Electrical leakage between electrodes in an electrochemical cell is determined by initially overcharging the cell to place it in a fully charged state. Various methods are available to ascertain a full charge, and a convenient method is disclosed in which the full charge is indicated by a predetermined rate of gassing at the electrodes. After receiving a full charge the cell is stored on open circuit for a time, during which some of the charge is dissipated due to leakage, and is then recharged to achieve an onset of gassing condition. The gas from the cell is conducted to a pressure vessel where it is filtered and slowly exhausted to the atmosphere while the pressure is monitored. An anomalous delay, relative to a reference cell, in achieving the onset of gassing condition indicates a cell leakage. The method and apparatus disclosed provides a convenient and considerably faster way than previously known to test for cell leakage.

10 Claims, 4 Drawing Figures

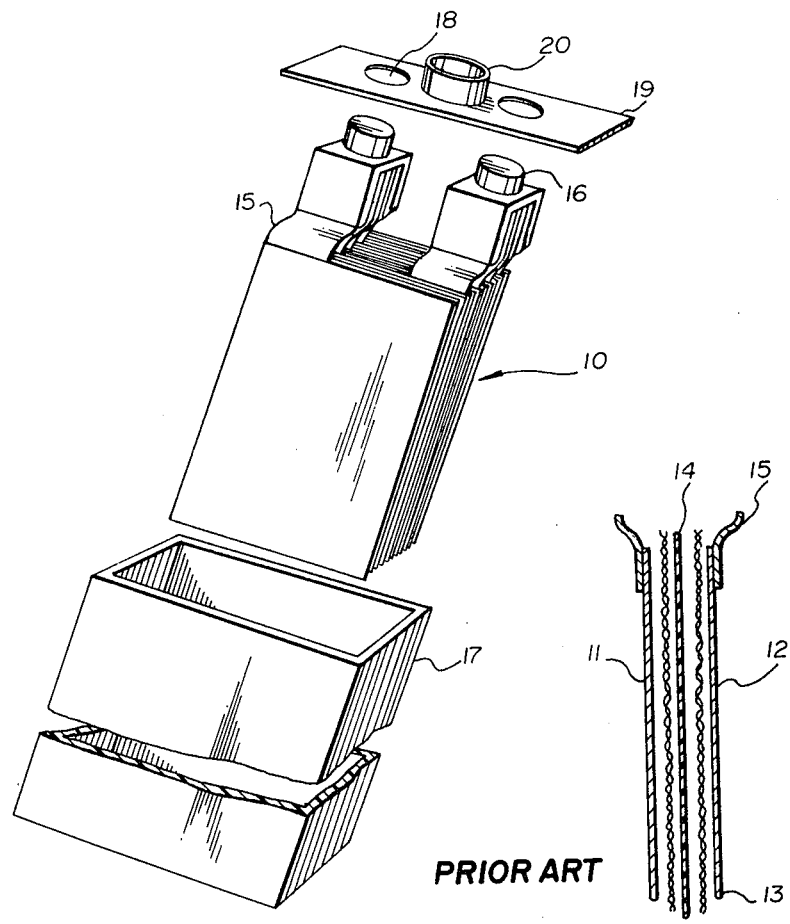
FIG. 1
FIG. 2 PRIOR ART
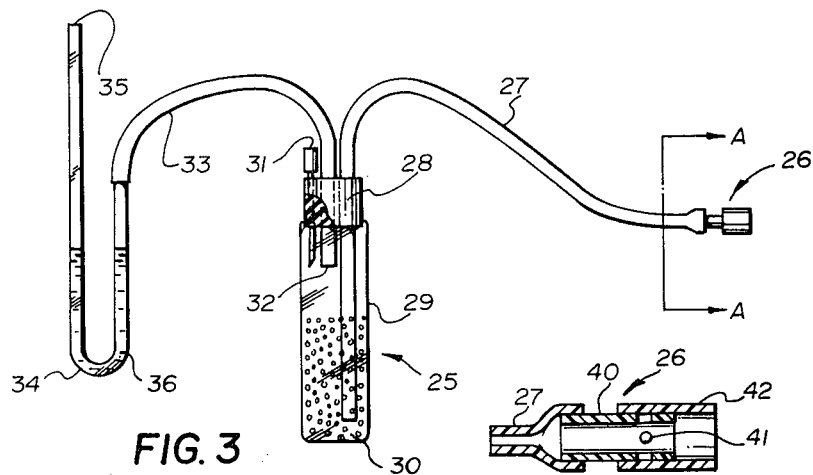
FIG. 3
FIG. 4

4,097,803

BATTERY SELF-DISCHARGE INDICATOR

BACKGROUND OF THE INVENTION

This invention relates to a method and apparatus for testing an electrochemical cell and more particularly to such method and apparatus for qualitatively ascertaining electrical leakage between the electrodes of the cell.

In a battery pack which employs a plurality of electrically interconnected electrochemical cells, battery failure frequently occurs as a result of electrical leakage developing between the electrodes of one or more cells. Moreover, since each cell usually comprises a plurality of anode and cathode electrode plates, the probability of electrical leakage is considerbly increased. For example, in the case of known flooded nickel-cadmium cells, which employ from about twenty to forty interleaved plates, the opportunities for electrical leakage are abundant.

The structure of the nickel-cadmium cell includes a plurality of adjacently placed nickel and cadmium plates which are interleaved in order to maximize the ampere-hour capacity per unit volume of the cell. Each adjacent pair of the plates are physically separated by means of nylon or other cloth and a barrier layer of cellophane or other suitable material which permits ionic exchange between the electrodes but inhibits the passage of oxygen from the nickel plate to the cadmium plate. The cell structure is thus laminated, and each pair of adjacent plates are separated by two layers of cloth, between which is sandwiched the barrier layer.

Under conditions of normal use it has been found that the barrier layer deteriorates, tending to develop minute cracks in which metallic particles deposit to form conductive paths between electrodes. A similar process may occur through natural pores in substitute materials. The leakage condition is terminal and becomes increasingly aggravated with time so that once such conductive paths have been initiated, the inevitable result is failure of the cell. However, before eventual failure of the cell occurs, it usually has sufficient capacity to continue in service and may in fact be employed in applications where abrupt battery failure could produce dire results, as aboard an aircraft.

Many of the failures of flooded nickel-cadmium batteries in aircraft occur as a result of a condition popularly referred to as "thermal runaway". The condition may be propitiated by the aforenoted electrical leakage, also referred to as a short circuit, in individual cells. Most of these short circuits start as high resistance (low electrical leakage) paths formed by migration of metal particles through the separator materials in areas not protected by the barrier component of the separator, as well as through failure of the barrier material itself as previously noted. As more and more metal collects in the areas over a long period of time, the resistance of each leakage path decreases and finally the leakage current reaches proportions which can have destructive consequences.

Thermal runaway is a term used to indicate a condition of positive feedback wherein a charging current overheats the battery, which in turn lowers its back voltage, which then allows further charging current into the battery as a result of which further heat is generated. It is apparent, therefore, that a battery with an electrical leakage condition will tend towards a thermal runaway state as a result of I²R losses and thermodynamic effects caused by electrical current flow along the leakage paths. The condition is relatively common aboard aircraft because of an aircraft's large capacity, voltage controlled charging system which can readily produce excessive charging currents to overheat a leaky or shorted cell and burn out a cell casing. Additionally, electrolysis of water would result in the generation of hydrogen and oxygen gases to produce an explosive mixture that could be ignited by the intense heat occurring in thermal runaway of the cell. There is, therefore, the added threat of an explosion. Thermal runaway is therefore a potentially very serious condition aboard aircraft where an afflicted cell may, at the very least, leak electrolyte which can damage control cables or cause failure of the electrical system. In any event, cell failure during a flight could be catastrophic.

An advantage that nickel-cadmium cells offer is a long period of high efficiency use wherein the voltage of the cell remains substantially constant until such time as the cell is nearly exhausted, whereupon the cell voltage drops rather precipitously. although this feature is advantageous it also has a drawback, there being no practical way to determine the state of the battery charge using voltage measurements.

One way in which a nickel-cadmium cell can be tested to determine its electrical capacity, and hence leakage, is time consuming and takes approximately one week to perform. In performing this test, it is first necessary to determine the amount of fresh charge in a cell which is done by discharging the cell shortly after it is fully charged. Secondly, the amount of charge is similarly ascertained about a week after the cell is fully charged. An anomalous reduction in the latter as compared to the former measurement is evidence of formation of a self-discharge path. In order to ensure accurate results, care must be exercised in conducting each measurement. Thus, the battery must be fully charged each time and it must be determined that cell to cell variations in capacity and in "higher oxides" formation and decay do not obscure results. As a result of these requirements, the process tends to be too time consuming for routine battery shop practice.

SUMMARY OF THE INVENTION

The invention herein to be described provides both a method and apparatus to test a flooded nickel-cadmium cell for internal electrical leakage.

The method and apparatus of the present invention is also applicable to any electrochemical cell that gasses when fully charged or when in a nearly fully charged state.

The invention also provides a method of testing to determine the presence of electrical leakage in substantially less time than in previously known methods.

The aforenoted disadvantges of the prior art may be substantially overcome and the provisions of the invention achieved by recourse to the invention as described herein. In this respect, one aspect of the invention relates to a method for detecting electrical leakage between electrodes in an electrochemical cell and comprises the steps of:

charging the cell to a fully charged condition;
storing the cell on open circuit for a predetermined period to permit at least partial dissipation of the full charge due to the leakage;
recharging the cell to an onset of gassing condition;
measuring the duration of recharge to achieve the gassing condition; and comparing the duration with a like parameter of a reference cell to ascertain the presence of the leakage.

The invention also relates to apparatus for detecting electrical leakage between electrodes in an electrochemical cell relative to a reference cell. The apparatus comprises pressure vessel means of substantially constant volume having walls defining a closed chamber including a gas inlet, a gas exhaust outlet having a smaller port dimension than the inlet for communicating the chamber with the atmosphere, and a pressure monitoring outlet. The apparatus further comprises tube means communicating the gas inlet with a gas vent of individual ones of the cells and means communicating with the monitoring outlet for measuring the gas pressure of individual ones of the cells relative to the atmospheric pressure and correlating said gas pressure to a rate of gas emission.

DESCRIPTION OF THE DRAWINGS

The invention will now be more particularly described with reference to embodiments thereof shown, by way of example, in the accompanying drawings wherein:

FIG. 1 is a perspective exploded view of a known flooded nickel-cadmium cell showing the internal cell structure;

FIG. 2 is a side elevaton view of a portion of the cell structure of FIG. 1;

FIG. 3 is a side elevation view of apparatus for testing the cell of FIG. 1; and FIG. 4 is an enlarged sectional side view of a coupler taken along the line A—A of FIG. 3.

DESCRIPTION OF THE ILLUSTRATED EMBODIMENT

FIG. 1 is an exploded perspective view of an electrochemical nickel-cadmium cell 10. The cell comprises a plurality of alternately arranged nickel and cadmium electrode plates, 11 and 12, respectively. A pair of plates may be seen in FIG. 2 which is an enlarged view of a portion of the side elevation of FIG. 1. It will be seen that each pair of plates are separated by two layers of nylon cloth 13 between which is sandwiched a cellophane barrier layer 14. The purpose of the layer 14 is to permit ionic exchange between the plates 11 and 12 but to inhibit transfer of oxygen gas from the nickel plate 11 to the cadmium plate 12 due to the reactivity of cadmium metal. In view of the rather fragile nature of the layer 14, it is placed between the layers of nylon cloth 13 for protection. Each plate is connected by means of a connecting strap 15 to a terminal lug 16. All nickel plates 11 are connected to a positive terminal whereas the cadmium plates are all connected to a negative terminal.

The electrolyte required by the cell 10 is potassium hydroxide (KOH), and in the cell illustrated a thirty percent by weight solution of KOH is used. The electrolyte is contained in a battery case 17 which is commonly fabricated of nylon because this material possesses a relatively high resistance to impact damage.

Each terminal lug 16 protrudes through a corresponding aperture 18 in a battery case cover 19. The cover 19 is sealably joined to the peripheral edge of the case 17 to prevent leakage of the electrolyte. Similarly, each lug 16 is sealed in its aperture 18 to prevent leakage. The cover 19 is provided with an electrolyte filling port 20 which includes a leak resistant gas exhaust vent that is normally closed to retain the electrolyte but which opens under pressure to relieve gas pressure developed at the plates 11 and 12.

The voltage produced by each cell is approximately 1.3 to 1.4 volts. Accordingly, since the DC power system aboard aircraft is nominally 24 volts, 19 cells are required. The cells are serially interconnected and are closely packed within a sealable container (not shown) that is pressure vented to prevent an explosive accumulation of hydrogen and oxygen gases generated by electrolysis of the electrolyte solution during cell overcharge. The port 20 of each cell 10 is normally upstanding to provide battery ventilation as well as to receive electrolyte for replenishing the electrolyte solution as required.

Extended charging of a cell 10 results first in conversion of most of the active materials of the plates 11 and 12 from a discharged to a charged form. As this process approaches completion, some of the positively charged material of the plate 11 may start to be converted to "higher oxides" and, at a predetermined voltage, water in the electrolyte is electrolyzed and breaks down into its component gases, hydrogen and oxygen. Watching for a suitable maximum gassing rate is one convenient method for ensuring that a cell is fully charged. But, other known methods may also be used to ensure a full charge. When a cell 10, after having been on extended charge as described, is allowed to stand on open circuit, the higher oxides break down spontaneously over a period of perhaps twenty or thirty hours. The remaining charged materials are relatively stable and normally revert to the uncharged state at a negligibly slow rate in the present context. If charging is resumed after the cell stands on open circuit for several hours, the broken down higher oxides start to be regenerated. The cell voltage then shortly attains a sufficient magnitude for the generation of gas to resume.

FIG. 2 illustrates the manner in which the plates 11 and 12 are separated by the cloth 13 and the cellophane barrier layer 14. Since the cloth 13 is of relatively open weave construction, the presence of the layer 14 operates to prevent a bridging accumulation of metallic particles from forming a direct leakage path between the plates 11 and 12. Although cellophane has intrinsic physical characteristics necessary for the layer 14, it is a substance not without drawbacks which include a relatively short life span. In this respect, cracks develop as the cellohane ages. As a result of such crack formation, metallic particles tend to collect therein and form leakage paths between the plates 11 and 12 due to a metallic particle buildup.

If the cell 10 has a leakage path and is partly discharged during the open circuit stand, when charging is resumed the discharged material is recharged and the onset of gas generation is delayed accordingly.

It is difficult to assign quantitative measurements to each of the foregoing processes since they tend to vary with a variety of internal and exteral conditions and overlap each other in time. Also, under some conditions very low rates of gas emission may persist at an early state of charge. However, since all of the cells in a given battery are subjected to the above process, the similarities in conditions and behavior between most of the cells make it possible to recognize the behavior of those cells which have leakage paths. Thus, in the case of a battery pack of the type used aboard an aircraft, individual ones of the cells may be measured and compared with one another to determine the presence of leakage paths in any cell. An alternative method would be to compare the results obtained from a known good cell with test results obtained from cells of uncertain condition.

The individual cells 10 of the battery pack may be readily tested for leakage by using a gassing rate measuring apparatus 25 shown in FIG. 3 of the drawings. Usually, a separate apparatus 25 is employed for each cell 10. A coupler 26 is connected to the port 20 of the cell and any gas generated within the case 17 is conducted by way of tubing 27 through a stopper 28 into a pressure vessel 29. The gas is conducted through a filter comprising a plurality of glass beads 30 disposed in the vessel 29 in order to remove any droplets of electrolyte carried by the gas evolved at the electrodes of the cells. The beads 30 are periodically washed with water to remove any electrolyte. Contamination of the apparatus following the pressure vessel 29 is therefore prevented by trapping out the electrolyte.

The stopper 28 includes a gas exhaust outlet 31 having a smaller port dimension than the inlet from the coupler 26, and is employed in a method for measuring flow rate by monitoring the pressure that develops to cause the same quantity of gas to escape through the outlet 31 as enters by the inlet from the coupler 26.

A pressure monitoring outlet 32 is communicated by way of a length of tubing 33 to a sensitive pressure gauge, or, as shown, to a manometer 34 having an open end 35. The manometer 34 is filled with a coloured liquid 36 in order to present a readily visible display indicating the pressure developed inside the vessel 29, which pressure is proportional to the rate of gas flow ron the cell 10.

FIG. 4 is a longitudinal sectional view of the coupler 26 taken along the lines A—A of FIG. 3. An end portion of the tubing 27 is connected to one end of a pipe 40. The other end of the pipe 40 has a plurality of ports 41 that perforate the walls of the pipe adjacent said other end. This latter end is covered by a portion of elastic tubing 42 having a free end that may be stretched to fit over the filling port 20. The presence of the ports 41 and the elastic tubing 42 provides a pressure relief valve system in the event of a blockage occurring in the apparatus 25. Accordingly, if the gas pressure within the tubing 27 becomes excessive, such excessive pressure displaces the tubing 42, which normally covers the ports 41, and relieves the pressure.

The method of the present invention will next be described. If a battery pack is known to have been on overcharge for an extended period of time and has not been significantly discharged since, as for example when it is removed from an aircraft soon after a flight, let the battery pack stand on open circuit for a time. If the foregoing conditions do not apply, first fully charge the battery (with extensive overcharge) then let it stand on open circuit, say, overnight, during which some of the charge will be dissipated due to leakage. Attach each cell via its port 20 to a coupler 26 of each channel of the apparatus 25. Thereafter, the battery is again placed on charge and the duration of recharge to achieve the onset of gassing condition is noted.

Each channel of the apparatus 25 includes the individual component item illustrated in FIG. 3. The gas within the vessel 29 is permitted to be slowly exhausted through the outlet 31, and the manometer 34 measures the pressure developed in the vessel, as compared to atmospheric pressure,, via the open end 35. The pressure is proportional to the rate of gas flow from the cell 10. In order to facilitate the use of such apparatus, the manometers for all of the channels are arranged adjacent to each other so that relative responses can be readily and rapidly perceived.

The relationship of the gas pressure parameter and electrical leakage in the cell 10 may now be seen and usefully applied by the method and apparatus of the present invention. Having determined that short circuits in flooded nickel-cadmium cells usually start as low electrical leakages which build up slowly over a long period of time, this characteristic provides an opportunity to detect the leakages and remove any offending cell from service before the catastrophic state is reached. Accordingly, the presence of such low leakages can be detected in a reasonable period of test time by observing an anomalous delay in the onset of gassing, as indicated by the apparatus 25, when charging is commenced after the previously fully charged battery has been allowed to stand on open circuit for a suitable period of time. Thus, whereas in rhe prior art a qualitative test for determining leakage requires approximately one week to perform, by recourse to the invention the same test result may be obtained within a matter of hours.

What I claim is:

1. A method for detecting electrical leakage between electrodes in an electrochemical cell, comprising the steps of:
   charging the cell to a fully charged condition;
   storing the cell on open circuit for a predetermined period to permit at least partial dissipation of the full charge due to said leakage;
   recharging the cell to an onset of gassing condition;
   measuring the duration of recharge to achieve said gassing condition; and
   comparing said duration with a like parameter of a refernce cell to ascertain the presence of said leakage.

2. A method as claimed in claim 1 wherein the fully charged condition is indicated by a predetermine rate of gassing at the electrodes.

3. A method as claimed in claim 2 comprising the further steps of:
   conducting the evolved gas to a closed chamber having an orifice adapted to slowly exhaust the gas to the atmosphere; and
   measuring the gas pressure within the chamber relative to atmospheric pressure whereby an anomalous delay in the onset of gassing indicates said leakage.

4. A method as claimed in claim 3 comprising the further step of filtering the gas conducted to the closed chamber to remove droplets of electrolyte carried by said gas.

5. Apparatus for detecting electrical leakage between electrodes in an electrochemical cell relative to a reference cell, comprising:
   pressure vessel means of substantially constant volume having walls defining a closed chamber including a gas inlet, a gas exhaust outlet having a smaller port dimension than said inlet for communicating said chamber with the atmosphere, and a pressure monitoring outlet;
   tube means communicating the gas inlet with a gas vent of individual ones of the cells; and
   means communicating with the monitoring outlet for measuring gas pressure of individual ones othe cells relative to atmospheric pressure and correlating said gas pressure to a rate of gas emission.

6. Apparatus as claimed in claim 5 further comprising filter means to remove droplets of electrolyte carried by gas evolved at the electrodes of individual ones of the cells.

7. Apparatus as claimed in claim 6 wherein the means for measuring gas pressure is a manometer.

8. Apparatus as claimed in claim 7 wherein the filter means comprises a plurality of glass beads disposed within said chamber about the gas inlet.

9. Apparatus as claimed in claim 8 further comprising a connector joining an end of said tube means with the gas vent and comprising:

a pipe having an end adapted to fit inside the tube means, the free end of the pipe having a plurality of ports perforating the walls of the pipe adjacent said free end; and a length of elastic tubing, one end being adapted to stretchably engage the gas vent and the other end being disposed over said free end in releasably sealing relation with said ports to open said ports in response to a predetermined gas pressure.

10. Apparatus as claimed in claim 9 further comprising a separate pressure vessel, tube means and means for measuring gas pressure for each electrochemical cell.

* * * * *